(12) United States Patent
Bang (10) Patent No.: US 8,562,282 B2
(45) Date of Patent: Oct. 22, 2013

(54) LARGE CAPACITY WIND POWER GENERATOR

(76) Inventor: Boo-Hyeon Bang, Busan (KR)

( * ) Notice: Subject to any disclaimer, the term of this patent is extended or adjusted under 35 U.S.C. 154(b) by 550 days.

(21) Appl. No.: 12/804,165

(22) Filed: Jul. 14, 2010

(65) Prior Publication Data

US 2011/0272947 A1 Nov. 10, 2011

(30) Foreign Application Priority Data

May 4, 2010 (KR) .................. 10-2010-0042144

(51) Int. Cl.
*F03D 7/00* (2006.01)
*F03D 7/02* (2006.01)

(52) U.S. Cl.
USPC .................. 415/4.2; 415/4.4; 416/41

(58) Field of Classification Search
USPC .................. 416/40, 41, 31; 415/4.2, 4.4
See application file for complete search history.

(56) References Cited

U.S. PATENT DOCUMENTS

| 237,078 | A | * | 1/1881 | Torre | 415/4.2 |
| 419,345 | A | * | 1/1890 | Otto | 415/4.2 |
| 5,375,968 | A | * | 12/1994 | Kollitz et al. | 415/2.1 |
| 2008/0101932 | A1 | * | 5/2008 | Gradwohl et al. | 416/132 B |
| 2009/0001730 | A1 | * | 1/2009 | Kuo et al. | 290/55 |
| 2009/0184521 | A1 | * | 7/2009 | Chong | 290/55 |

FOREIGN PATENT DOCUMENTS

| KR | 2002-0076732 | 10/2002 |
| KR | 10-0924527 | 11/2009 |
| KR | 10-0927237 | 11/2009 |

* cited by examiner

*Primary Examiner* — Nathaniel Wiehe
*Assistant Examiner* — Alonzo N Coleman
(74) *Attorney, Agent, or Firm* — Farjami & Farjami LLP (57) ABSTRACT

A large capacity wind power generator is provided, which includes an outer rotor including an upper partitioning plate having a plurality of spokes formed along a circular circumference of the upper partitioning plate at equal intervals and a side partitioning plate formed on one side surface of the outer rotor, the outer rotor having a lower surface and the other side surface which are open; and a windmill formed inside the outer rotor to be rotated by wind flowing through the outer rotor. The side partitioning plate is formed to have an area that is smaller than a half of the entire circumferential area of the outer rotor, and spaces between the respective spokes are open so as to facilitate an inflow of the wind through the side surface of the outer rotor.

4 Claims, 5 Drawing Sheets

LARGE CAPACITY WIND POWER GENERATOR

CROSS-REFERENCE TO RELATED APPLICATION

This application is based on and claims priority from Korean Patent Application No. 10-2010-42144, filed on May 4, 2010 in the Korean Intellectual Property Office, the disclosure of which is incorporated herein in its entirety by reference.

BACKGROUND OF THE INVENTION

1. Field of the Invention

The present invention relates to a large capacity wind power generator. More particularly, the present invention relates to a large capacity wind power generator which can perform large power generation with a stable structure.

2. Description of the Prior Art

A wind power generator is an appliance that generates electricity using wind. While a hydroelectric power generator and a thermal power generator generate electricity by turning a generator with the water power and the vapor power, respectively, a wind power generator turns a generator, which is a device that converts the rotating force into electricity, with the wind power.

Since the wind power generator uses the wind power, no fuel is required and thus pure green energy can be produced without environmental pollution. Recently, the wind power generator has been wide-spread even for home use since it generates low noise.

The wind power generator is classified into a horizontal axis type and a vertical axis type. The horizontal axis type has rotors, which are parallel to ground, and the vertical axis type has rotors, which are perpendicular to ground. Since the vertical axis type has merits in that it can generate power even if the wind blows in any direction, and occupies a small area, it is used in a small generator for home use.

However, the vertical axis type small generator has the problem that it cannot generate sufficient power, and thus it has low power generation efficiency.

SUMMARY OF THE INVENTION

Accordingly, the present invention has been made to solve the above-mentioned problems occurring in the prior art while advantages achieved by the prior art are maintained intact.

An embodiment of the present invention relates to a large capacity wind power generator which has a stable structure and achieves a large power generation by adopting an outer rotator support, a wind indicator plate support, a five-stage wind indicator plate structure, and a two-stage revolution amplifying structure.

In one aspect of the present invention, there is provided a large capacity wind power generator, which includes an outer rotor including an upper partitioning plate having a plurality of spokes formed along a circular circumference of the upper partitioning plate at equal intervals and a side partitioning plate formed on one side surface of the outer rotor, the outer rotor having a lower surface and the other side surface which are open; and a windmill formed inside the outer rotor to be rotated by wind flowing through the outer rotor; wherein the side partitioning plate is formed to have an area that is smaller than a half of the entire circumferential area of the outer rotor, and spaces between the respective spokes are open so as to facilitate an inflow of the wind through the side surface of the outer rotor.

As described above, the large capacity wind power generator according to an embodiment of the invention has the following advantages.

First, a windmill support and an outer rotor support are provided on an upper surface of a support block, and thus it is possible to sufficiently support the windmill and the outer rotor support.

Second, since two-stage revolution amplification is possible using a first acceleration gear and a second acceleration gear, a large capacity power generation becomes possible.

Third, the upper partitioning plate has a spoke structure to make an inflow of the wind between the spokes possible, and thus the rotation of the outer rotor is efficiently performed.

Fourth, since the side partitioning plate is formed to have an area that is ¼ of the entire circumferential area of the outer rotor and the entire frames are formed using a shaft, an inflow of a large amount of wind becomes possible.

Fifth, since the wind indicator plate is installed to rotate the outer rotor always in a wind blowing direction, the rotation of the windmill becomes possible even if the wind blows in any direction.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto. In the drawings, sizes and relative sizes of layers and areas may be exaggerated for clarity in explanation.

All terms used in the description could be used as meanings commonly understood by those ordinary skilled in the art to which the present invention belongs. In addition, terms that are generally used but are not defined in the dictionary are not interpreted ideally or excessively unless they have been clearly and specially defined.

In addition, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims.

Figure 1:
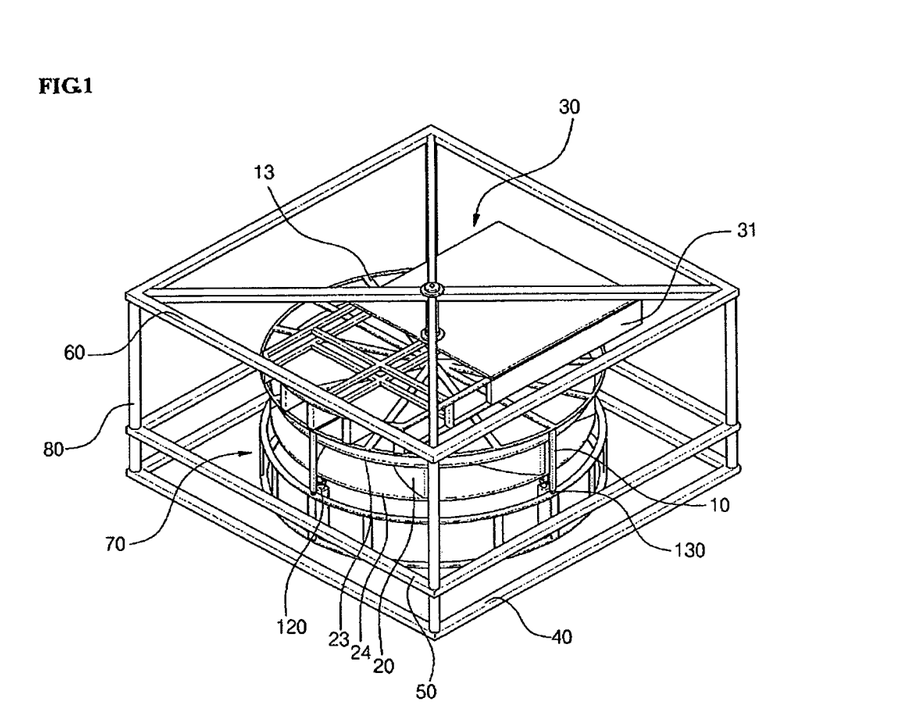
FIG. 1 is a perspective view illustrating a wind power generator according to an embodiment of the present invention.
Figure 2:
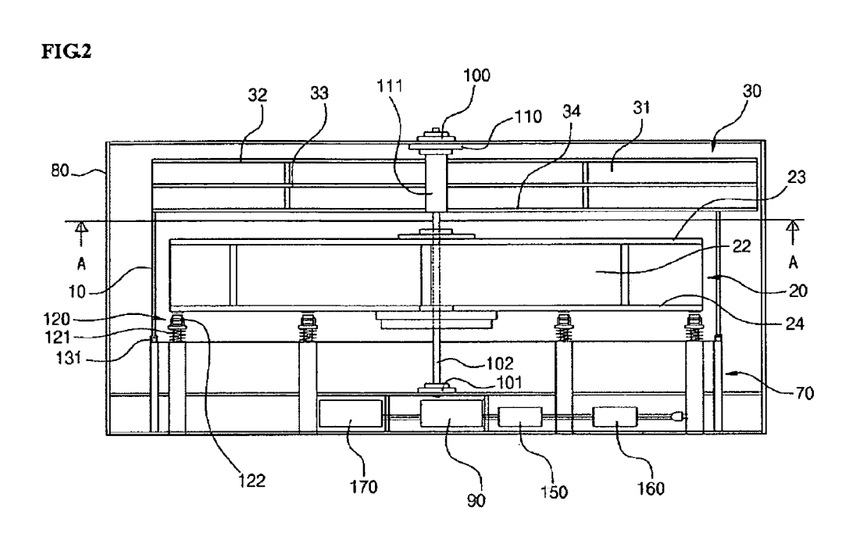
FIG. 2 is a front view of the wind power generator as illustrated in FIG. 1.
Figure 3:
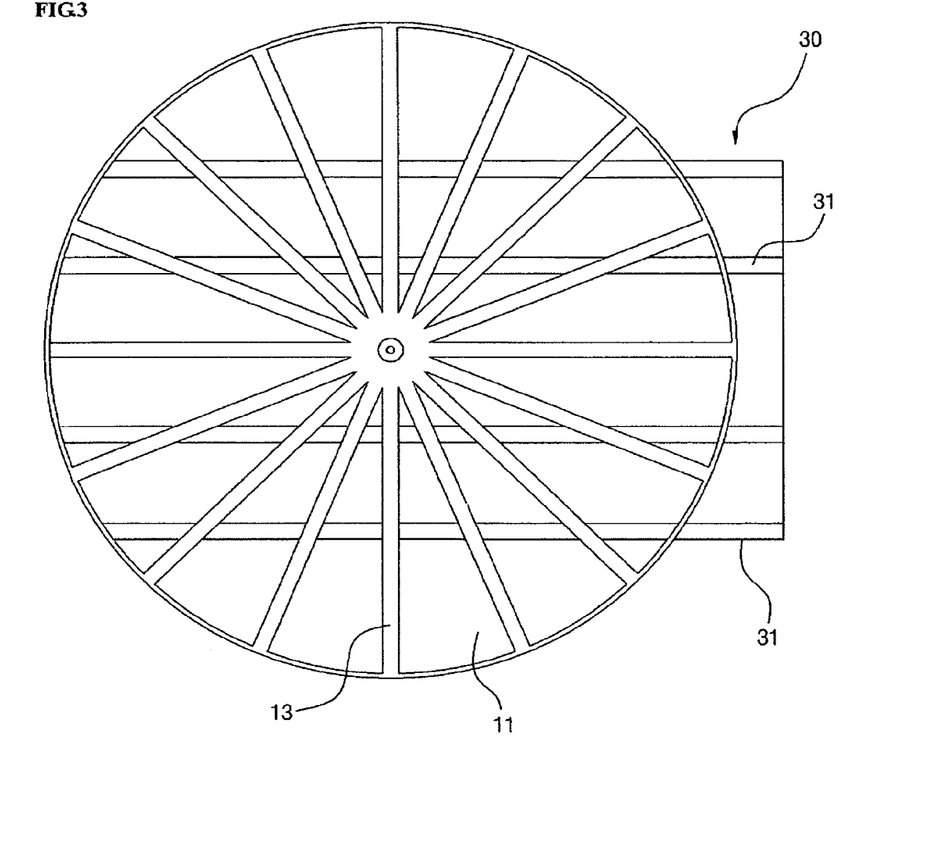
FIG. 3 is a sectional view of the wind power generator as illustrated in FIG. 2 taken along line A-A of FIG. 2.
Figure 4:
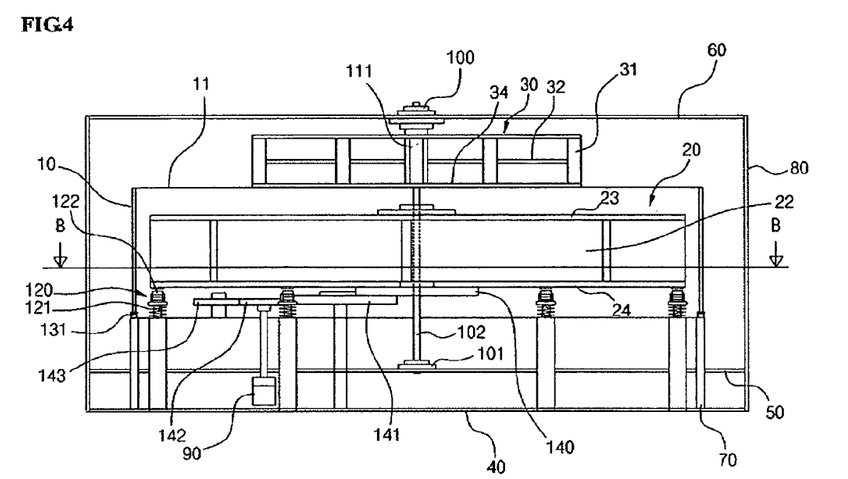
FIG. 4 is a side view of the wind power generator as illustrated in FIG. 1.
Figure 5:
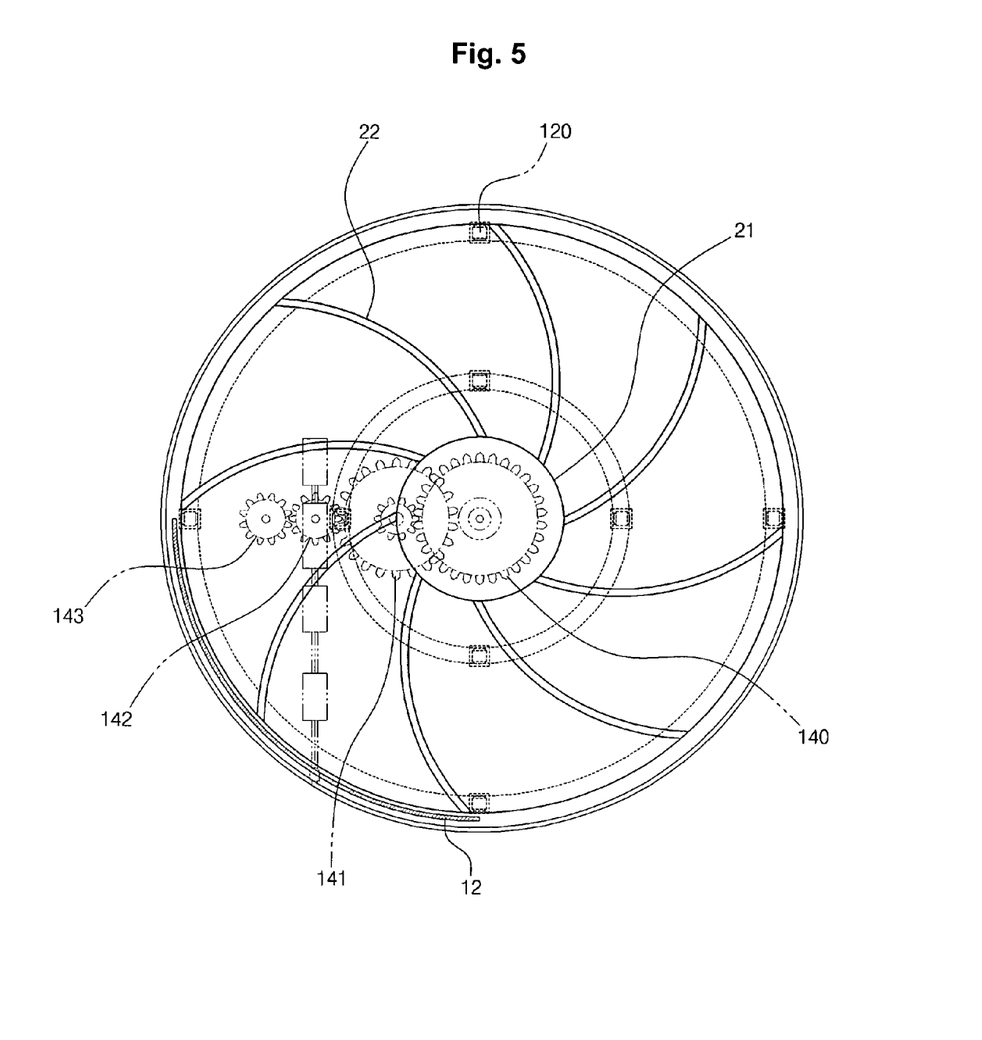
FIG. 5 is a section view of the wind power generator as illustrated in FIG. 4 taken along line B-B of FIG. 4.

FIG. 1 is a perspective view illustrating a wind power generator according to an embodiment of the present invention. FIG. 2 is a front view of the wind power generator as illustrated in FIG. 1, and FIG. 3 is a sectional view of the wind power generator as illustrated in FIG. 2 taken along line A-A of FIG. 2. FIG. 4 is a side view of the wind power generator as illustrated in FIG. 1, and FIG. 5 is a section view of the wind power generator as illustrated in FIG. 4 taken along line B-B of FIG. 4.

A large capacity wind power generator according to a preferred embodiment of the invention includes an outer rotor 10 including an upper partitioning plate 11 having a plurality of spokes 13 formed along a circular circumference of the upper partitioning plate 11 at equal intervals and a side partitioning plate 12 formed on one side surface of the outer rotor 10, the outer rotor 10 having a lower surface and the other side surface which are open; and a windmill 20 formed inside the outer rotor 10 to be rotated by wind flowing through the outer rotor 10; wherein the side partitioning plate 12 is formed to have an area that is smaller than a half of the entire circumferential area of the outer rotor 10, and spaces between the respective spokes 13 are open so as to facilitate an inflow of the wind through the side surface of the outer rotor 10.

The large capacity wind power generator according to an embodiment of the invention includes the outer rotor 10 and the windmill 20.

The outer rotor 10 includes the upper partitioning plate 11 and the side partitioning plate 12. The outer rotor 10 performs a function of making the wind flow into the outer rotor 10. The outer rotor 10 is formed outside the windmill 20, and is in the form of a cylinder as a whole.

As illustrated in FIG. 3, on the upper partitioning plate 11, a plurality of spokes 13 is provided to extend in a radial direction from the center of the upper partitioning plate 11 at equal intervals. The side partitioning plate 12 formed on one side surface of the outer rotor 10 is in a closed shape as a whole.

The lower surface and the other side surface of the outer rotor 10 are formed to be open, and spaces between the respective spokes 13 of the upper partitioning plate 11 are also open. Accordingly, an inflow of a large amount of wind is possible, and the outer rotor and the windmill meet with a little resistance even against a strong wind.

The wind flowing through the outer rotor 10 rotates the windmill 20 inside the outer rotor 10, and the wind, having rotated the windmill 20, flows out of the outer rotor 10. As this process is repeated, the windmill 20 continues to be rotated.

The side partitioning plate 12 is formed to have a sectional area that is smaller than a half of the entire side surface area of the outer rotor 10 so as to facilitate an inflow of the wind through the side surface of the outer rotor 10. If the side partitioning plate 12 is formed to have a sectional area that is larger than a half of the entire side surface area of the outer rotor 10, the wind-inflow area is reduced, and thus the rotation of the windmill 20 is not facilitated as a whole.

In the large capacity wind power generator according to a preferred embodiment of the invention, on an upper side of the upper partitioning plate 11, a wind indicator plate 30, which is rotatable according to the wind direction, is installed to position the outer rotor 10 in a wind blowing direction.

On the upper partitioning plate 11, the wind indicator plate 30 is formed. The wind indicator plate 30 is rotated according to the wind direction to make the outer rotor 10 always face in the wind blowing direction.

If wind blows, the wind indicator plate 30 is rotated according to the wind direction to be positioned in the rear, and the windmill 20 is rotated by the wind. That is, the wind indicator plate 30 and the outer rotor 10 are combined in a body, and by the wind indicator plate 30, the outer rotor 10 is rotated always in the direction where the largest amount of wind can flow into the outer rotor 10.

In the large capacity wind power generator according to a preferred embodiment of the invention, the windmill 20 includes blades 22 which are rotated by the wind flowing through wind inlets; a center post 21 which prevents movement of the blades 22 in left and right directions; and upper and lower surface plates 23 and 24 placed on upper and lower sides of the blades 22, respectively. The blades 22 extend in a radial direction from the center post 21, and each of the blades 22 is in the shape of an arc.

The windmill 20 includes the blades 22, the center post 22, the upper surface plate 23, and the lower surface plate 24.

The blades 22 are portions that directly meet the wind, and each of the blades 22 is in the shape of an arc so that the inflow wind forms vortex to flow out.

The center post 21 is formed in the center of the windmill 20 to achieve smooth wind power generation without left and right movement of the blades 22 even in the case where a strong wind such as a typhoon acts on the windmill 20. The blades 22 are formed preferably to extend in the radial direction from the center post 21 at uniform intervals.

The upper surface plate 23 and the lower surface plate 24 are portions that support the blades 22 to prevent upward and downward movement of the blades 22, and have the same shape.

It is possible to additionally install inertia pieces on outer surfaces of the blades 22. In this case, the rotational moment of inertia is increased, and once the rotation occurs, it becomes possible to continue the rotation. That is, even if the wind blows intermittently, continuous rotation is maintained to increase the power generation efficiency.

In the large capacity wind power generator according to a preferred embodiment of the invention, when the wind blows and the wind indicator plate 30 is positioned in the rear, the side partitioning plate 12, which has an area that is ¼ of the entire circumferential area of the outer rotor 10, is positioned in the counterclockwise direction based on the wind blowing direction.

As a result of evaluation, the area of the side partitioning plate 12 is preferably ¼ of the entire circumferential area of the outer rotor 10. If the side partitioning plate 12 is formed to have an area that is smaller than ¼ of the entire circumferential area of the outer rotor 10, the wind, which flows into the outer rotor 10 to rotate the windmill 20 and then flows out of the outer rotor 10, may collide with the wind that flows into the outer rotor 10 through portions where the side partitioning plate 12 is not formed to cause the wind to flow backward.

When the wind blows and the wind indicator plate 30 is positioned in the rear, the side partitioning plate 12 is positioned preferably in the counterclockwise direction based on the wind blowing direction.

The large capacity wind power generator according to a preferred embodiment of the invention further includes a bottom frame 40 formed on the bottom of the wind power generator; a middle frame 50 installed on an upper side of the bottom frame 40, being apart from the bottom frame 40, and formed of a plurality of shafts; an upper frame 60 provided on an upper side of the middle frame 50, being apart from the middle frame 50; a plurality of fixing shafts 80 extending upward from edges of the bottom frame 40 and connected up to edges of the upper frame 60 through the middle frame 50;

and a support block 70 extending from the bottom frame 40 up to a height between the middle frame 50 and the upper frame 60 to support the outer rotor 10 and the windmill 20; wherein the outer rotor 10 and the wind indicator plate 30 are positioned between the support block 70 and the upper frame 60, and the support block 70 has a horizontal sectional area that is equal to that of the outer rotor 10.

The outer rotor 10 and the wind indicator plate 30 are supported by the bottom frame 40, the middle frame 50, the upper frame 60, the fixing shafts 80, and the support block 70.

The middle frame 50 is formed of a plurality of shafts, and this is to maximally secure the inflow of the wind through the middle frame 50 itself. In the same manner as the middle frame 50, the upper frame 60 is preferably formed of a plurality of shafts.

By the plurality of fixing shafts 80 formed in a vertical direction, the bottom frame 40, the middle frame 50, and the upper frame 60 are fixed. A combining method between the fixing shafts 80 and the respective frames may be classified into a permanent combining method and a disassemble type combining method. The permanent combining method includes welded joint and soldered joint, which can save the cost of maintenance and installation. The disassemble type combining method is used when it is required to movably install the wind power generator. In this case, flanges are made on the combined portions, screw holes are formed on the combined portions, and then the combined portions are combined using elbows, T, branches, and the like.

The support block 70 extends from the bottom frame 40 up to a height between the middle frame 50 and the upper frame 60. Since the outer rotor 10 and the wind indicator plate 30 are positioned between the support block 70 and the upper frame 60, the support block 70 serves to support the outer rotor 10 and the windmill 20 as a whole.

The support block 70 has the same horizontal sectional area as that of the outer rotor 10, and is positioned within a hexahedral frame formed by the upper frame 60, the middle frame 50, and the fixing shaft 80. For the smooth inflow of the wind through the support block 70, it is preferable that the support block 70 is formed of a plurality of shafts.

The large capacity wind power generator according to a preferred embodiment of the invention further includes a first bearing 100 formed in the center of the upper surface of the upper frame 60; a third bearing 101 formed in the center of the upper surface of the middle frame 50; and a first rotary shaft 102 which vertically penetrates the windmill 20 and is inserted into the first bearing 100 and the third bearing 101; wherein the first rotary shaft 102 is rotated as the blades 22 are rotated.

For the rotation of the windmill 20, the first bearing 100, the third bearing 101, and the first rotary shaft 102 are provided.

The first bearing 100 and the third bearing 101 are in the same shape, and are formed in the center of the upper surfaces of the upper frame 60 and the middle frame 50, respectively.

The first rotary shaft 102 is inserted into the first bearing 100 and the third bearing 101.

Since the first rotary shaft 102 penetrates the center of the windmill 20 and the windmill 20 is fixed to the first rotary shaft 102, the first rotary shaft 102 is simultaneously rotated when the windmill 20 is rotated by the wind.

The large capacity wind power generator according to a preferred embodiment of the invention further includes a second bearing 110 formed in the center of the lower surface of the upper frame 60; and a second rotary shaft 111 which is inserted into the second bearing 110 and extends up to the center of the upper partitioning plate 11; wherein the second bearing 110 has a diameter that is larger than that of the first bearing 100 and the third bearing 101.

For the rotation of the outer rotor 10, the second bearing 110 and the second rotary shaft 111 are provided.

The second rotary shaft 111 is inserted into the second bearing 110 that is formed in the center of the lower surface of the upper frame 60 and vertically extends up to the center of the upper partitioning plate 11.

Since the sectional area of the second bearing 110 is larger than that of the first bearing 100 and the third bearing 101, the diameter of the second rotary shaft 111 is larger than that of the first rotary shaft 102, and the first rotary shaft 102 is positioned within the second rotary shaft 111.

When the wind indicator plate 30 is rotated according to the wind direction, the second rotary shaft 11 is simultaneously rotated.

In the large capacity wind power generator according to a preferred embodiment of the invention, the wind indicator plate 30 includes a plurality of vertical plates 31 formed at a height that corresponds to the second rotary shaft and positioned in parallel to each other, being apart from each other; a first horizontal plate 32 connecting the upper sides of the vertical plates 31; a second horizontal plate 33 connecting the middle sides of the vertical plates 31; and a third horizontal plate 34 connecting the lower sides of the vertical plates 31; wherein the front end portions of the vertical plates 31, the first horizontal plate 32, the second horizontal plate 33, and the third horizontal plate 34 are open.

The wind indicator plate 30 is formed at a height corresponding to the second rotary shaft 111 so that it can promptly move toward the wind blowing direction as the wind blows.

Also, the wind blowing plate 30 includes the plurality of vertical plates 31, the first horizontal plate 32, the second horizontal plate 33, and the third horizontal plate 34. Since the vertical plates 31 are positioned in parallel to each other, being apart from each other, they have the same size. The first horizontal plate 32 that is a flat plate connecting the upper sides of the vertical plates 31, the second horizontal plate 33 connecting the middle sides of the vertical plates 31, and the third horizontal plate 34 connecting the lower sides of the vertical plates 31 have the same size. Since the plurality of vertical plates 31, the first horizontal plate 32, the second horizontal plate 33, and the third horizontal plate 34 are connected together to form a lattice-shaped structure, the wind power generator can stably operate even against the strong wind.

As illustrated in FIG. 1, the front end portions of the vertical plates 31, the first horizontal plate 32, the second horizontal plate 33, and the third horizontal plate 34 are open, and the rear end portions thereof are closed. Accordingly, it is possible for the wind indicator plate 30 to effectively move toward the wind blowing direction.

In the large capacity wind power generator according to a preferred embodiment of the invention, the odd-numbered vertical plates 31 are formed to extend backward from the front end portions of the upper partitioning plate 11 to the end points of the upper frame 60.

The odd-numbered vertical plates 31 may be, for example, 5 vertical plates 31.

As illustrated in FIG. 3, since the respective vertical plates 31 extend backward from the front end portions of the upper partitioning plate 11, the vertical plate 31 that is in the centermost position has the longest length. The length of the vertical plate 31 can extend preferably up to a range where no rotational interference occurs.

In the large capacity wind power generator according to a preferred embodiment of the invention, on the upper surface of the support block 70, a plurality of windmill supports 120, each of which includes an elastic member 121 that absorbs impact and a first roller 122 positioned on the upper side of the elastic member 121, and a plurality of outer rotor supports 130, each of which includes a second roller 131, are provided.

As illustrated in FIG. 2, on the upper surface of the support block 70, the windmill supports 120 and the outer rotor supports 130 are provided. Although it is possible to primarily support the windmill 20 and the outer rotor 10 by the first rotary shaft and the second rotary shaft 111, the support block 70 is provided to cope with the movement of the windmill and the outer rotor in the case where a strong wind blows.

The windmill support 120 includes the elastic member 121 and the first roller 122. In the windmill support 120, the first roller 122 is positioned on a "T"-shaped base composed of a body and a head. A spring is wound on the circumference of the body, and thus in the case where the windmill 20 comes into contact with the windmill support 120, the spring absorbs the impact and provides a reaction so as to restore the windmill 20 to its original position. Also, even in the case where the windmill 20 comes into contact with the windmill support 120, the first roller 122 guides a natural rotation of the windmill 20, and thus the rotation of the windmill 20 is not disturbed.

The outer rotor support includes the second roller 131. The second roller 131 serves to make the outer rotor 10 rotate smoothly even in the case where the outer rotor 10 comes into contact with the outer rotor support. In the same manner as in the windmill support 120, it is preferable that the outer rotor support includes elastic members.

In order to prevent the upward and downward movement of the outer rotor support, a rail may be installed on the lower surface of the upper frame 60, and a slider that is movable along this rail may be installed on the upper surface of the first horizontal plate 32. In normal conditions, the slider is positioned in a position where no interference exists, which is the middle portion of the rail, to make the wind indicator plate 30 rotate naturally, while in the case where the upward and downward movement of the outer rotor 10 occurs, the slider is sliding as it becomes in contact with the upper end or lower end of the rail, and thus serves to secure the natural rotation of the wind indicator plate 30 and to prevent an additional drooping of the wind indicator plate 30.

The large capacity wind power generator according to a preferred embodiment of the invention further includes a main gear 140 provided below the lower surface plate 24 to rotate simultaneously with the first rotary shaft 102; a first acceleration gear 141 rotating in engagement with the main gear 140; a second acceleration gear 142 rotating in engagement with the first acceleration gear 141; and a support gear 143 rotating in engagement with the second acceleration gear 142; wherein as the second acceleration gear 142 is rotated, the power generator provided in a generator case 90 that is positioned between the bottom frame 40 and the middle frame 50 outputs AC current.

As illustrated in FIG. 5, the wind power generator according to a preferred embodiment of the invention further includes the main gear 140, the first acceleration gear 41, the second acceleration gear 142, and the support gear 143.

The main gear 141 is rotated simultaneously with the first rotary shaft 102, and has the same number of revolutions as that of the windmill 20.

The first acceleration gear 141 is rotated to be in engagement with the main gear 140. Since the number of saw teeth of the first acceleration gear 141 is smaller than that of the main gear 140, the number of revolutions is primarily amplified.

The second acceleration gear 142 is rotated to be in engagement with the first acceleration gear. Since the number of saw teeth of the second acceleration gear is smaller than the first acceleration gear 142, the number of revolutions is secondarily amplified.

The support gear 143 is rotated to be in engagement with the second acceleration gear 142, and serves to prevent the left and right movement of the second acceleration gear 142.

As the second acceleration gear 142 is rotated, the power generator provided in the generator case 90 is rotated to output the AC current. That is, the second acceleration gear 142 and the generator are connected to the same rotary shaft, and thus are rotated with the same number of revolutions.

As illustrated in FIG. 2, through the generator, an inverter 150, and a rechargeable battery system 160, the electricity is supplied to the home.

The generator is positioned in the generator case 90 that is provided between the bottom frame 40 and the middle frame 50. The generator outputs the AC current using the rotating force.

The inverter 150 converts the AC current output from the generator into a DC current. Since the AC current cannot be directly stored, it is required to convert the AC current into the DC current.

The DC current is not stored as it is, but is stored as it is changed to chemical energy. The rechargeable battery system 160 serves to store the electricity energy in a chemical method. In the rechargeable battery system, a bi-directional chemical reaction, that is charging and discharging operation, occurs. When the electricity stored in the battery is used in the home, the discharging of the battery is performed, while when the electricity is stored in the battery by the wind power generator, the charging of the battery is performed.

Since the two-stage revolution amplifying process is performed for the large capacity power generation, the rotary shaft connected to the second acceleration gear 142 is rotated at very high speed. Accordingly, it is possible to use a disk brake and a computer system to maintain an appropriate number of revolutions. If the number of revolution is too excessive, the disk brake reduces the number of revolutions according to a control command of the computer system. Also, in the case where the rotary shaft continues to rotate, a large amount of heat is generated, and thus it is possible to provide a cooler 170 for lowering the generated heat. If the operation temperature exceeds a predetermined temperature, the cooler 170 is operated according to the control command of the computer system.

A lighting rod may be provided.

The lighting rod is formed to extend from the upper surface of the upper frame 60, and serves to reduce damage by guiding an impulse current such as the falling thunderbolt into ground. The electricity that is applied to the lighting rod bypasses to ground along a conductor connected to the lighting rod.

In the preferred embodiment of the invention, it is possible to use several large capacity wind power generators which are vertically piled up. That is, by vertically combining the large capacity wind power generators, the power generation as large as the number of wind power generators can be obtained.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A large capacity wind power generator, comprising:
an outer rotor including an upper partitioning plate having a plurality of spokes formed along a circular circumference of the upper partitioning plate at equal intervals and a side partitioning plate formed on one side surface of the outer rotor, the outer rotor having a lower surface and the other side surface which are open, wherein the side partitioning plate is formed to have an area that is smaller than a half of the entire circumferential area of the outer rotor, and spaces between the respective spokes are open so as to facilitate an inflow of the wind through the side surface of the outer rotor;
a windmill formed inside the outer rotor to be rotated by wind flowing through the outer rotor, wherein the windmill comprises blades which are rotated by the wind flowing through wind inlets, a center post which prevents movement of the blades in left and right directions, and upper and lower surface plates placed on upper and lower sides of the blades, wherein the blades extend in a radial direction from the center post and each of the blades is in the shape of an arc;
a wind indicator plate, which is rotatable according to the wind direction, installed on an upper side of the upper partitioning plate so as to position the outer rotor in a wind blowing direction;
a bottom frame formed on the bottom of the wind power generator;
a middle frame installed on an upper side of the bottom frame, being apart from the bottom frame, and formed of a plurality of shafts;
an upper frame provided on an upper side of the middle frame, being apart from the middle frame;
a plurality of fixing shafts extending upward from edges of the bottom frame and connected up to edges of the upper frame through the middle frame;
a support block extending from the bottom frame up to a height between the middle frame and the upper frame to support the outer rotor and the windmill;
a first bearing formed in the center of the upper surface of the upper frame;
a third bearing formed in the center of the upper surface of the middle frame;
a first rotary shaft which vertically penetrates the windmill and is inserted into the first bearing and the third bearing, wherein the first rotary shaft is rotated as the blades are rotated;
a second bearing formed in the center of the lower surface of the upper frame, wherein the second bearing has a diameter that is larger than that of the first bearing and the third bearing; and
a second rotary shaft which is inserted into the second bearing and extends up to the center of the upper partitioning plate;
wherein the outer rotor and the wind indicator plate are positioned between the support block and the upper frame, and the support block has a horizontal section area that is equal to that of the outer rotor;
wherein the wind indicator plate comprises a plurality of vertical plates formed at a height that corresponds to the second rotary shaft and positioned in parallel to each other, being apart from each other, a first horizontal plate connecting the upper sides of the vertical plates, a second horizontal plate connecting the middle sides of the vertical plates, and a third horizontal plate connecting the lower sides of the vertical plates, wherein front end portions of the vertical plates, the first horizontal plate, the second horizontal plate, and the third horizontal plate are open.

2. The large capacity wind power generator according to claim 1, wherein the vertical plates are formed to extend backward from the front end portions of the upper partitioning plate to the end points of the upper frame.

3. The large capacity wind power generator according to claim 2, wherein on the upper surface of the support block, a plurality of windmill supports, each of which includes an elastic member that absorbs impact and a first roller positioned on the upper side of the elastic member, and a plurality of outer rotor supports, each of which includes a second roller, are provided.

4. The large capacity wind power generator according to claim 3, further comprising:
a main gear provided below the lower surface plate to rotate simultaneously with the first rotary shaft;
a first acceleration gear rotating in engagement with the main gear;
a second acceleration gear rotating in engagement with the first acceleration gear; and
a support gear rotating in engagement with the second acceleration gear;
wherein as the second acceleration gear is rotated, the power generator provided in a generator case that is positioned between the bottom frame and the middle frame outputs AC current.

* * * * *